United States Patent [19]

Davis et al.

[11] Patent Number: 4,701,943

[45] Date of Patent: Oct. 20, 1987

[54] PAGING SYSTEM USING LPC SPEECH ENCODING WITH AN ADAPTIVE BIT RATE

[75] Inventors: Walter L. Davis, Coral Springs, Fla.; Dakshesh D. Parikh, San Jose, Calif.

[73] Assignee: Motorola, Inc., Schaumburg, Ill.

[21] Appl. No.: 930,072

[22] Filed: Nov. 12, 1986

Related U.S. Application Data

[63] Continuation of Ser. No. 815,474, Dec. 31, 1985, abandoned.

[51] Int. Cl.⁴ ............................................. H04M 11/00
[52] U.S. Cl. ................................. 379/57; 340/825.44; 379/88; 379/63
[58] Field of Search ................. 179/2 EC, 2 E, 2 EB, 179/18 BE; 340/311.1, 825.44, 825.48; 370/84

[56] References Cited

U.S. PATENT DOCUMENTS

| | | | |
|---|---|---|---|
| 4,161,629 | 7/1979 | Kits van Heyningen | 179/15 BA |
| 4,340,961 | 7/1982 | Capel et al. | 370/8.1 |
| 4,377,860 | 3/1983 | Goobole | 370/84 |
| 4,389,537 | 7/1983 | Tsunoda et al. | 179/15 M |
| 4,400,585 | 8/1983 | Kaman et al. | 179/2 EB |
| 4,479,124 | 10/1984 | Rodriguez et al. | 340/825.44 |
| 4,484,327 | 11/1984 | Hanson | 370/84 |

*Primary Examiner*—Robert Lev
*Attorney, Agent, or Firm*—Joseph T. Downey; Donald B. Southard; Anthony J. Sarli, Jr.

[57] ABSTRACT

A paging system providing an LPC encoded speech output having an adaptive bit rate. The LPC bit rate is adaptively modified based on paging system airtime loading. Synthesizer circuitry in the paging receivers, together with a system signalling scheme is used to update the paging receivers as to the LPC bit rate, allows the paging receiver to decode the adaptive bit rate signal.

2 Claims, 21 Drawing Figures

FIG. 5A
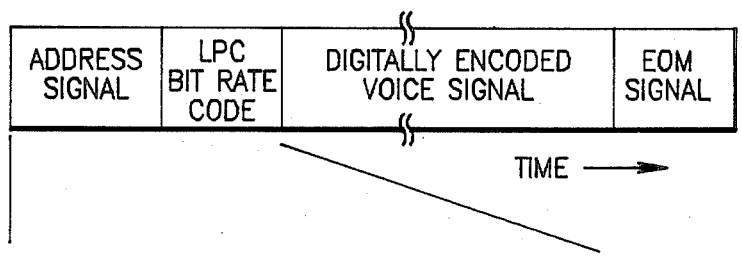
FIG. 5B
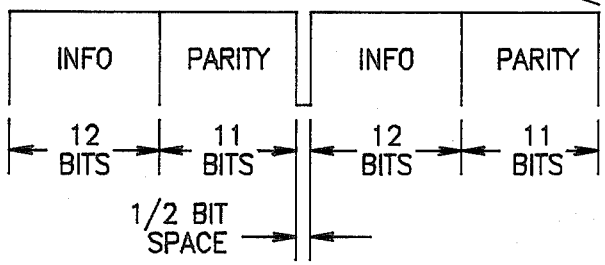
FIG. 5C
| BIT 1 | BIT 2 | BIT 3 | BIT 4 | BIT 5 | BIT 6 |
|---|---|---|---|---|---|
000000=2400 BF
010101=4800 BF
101010=7200 BF
111111=9600 BF
FIG. 5D
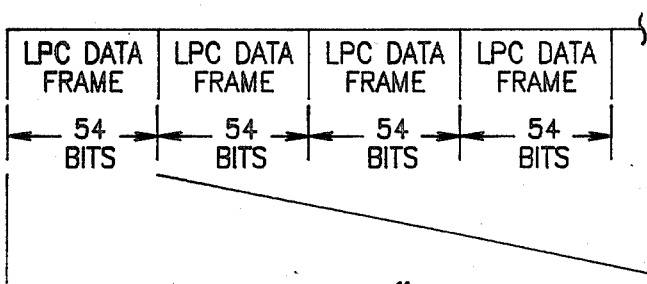
FIG. 5E
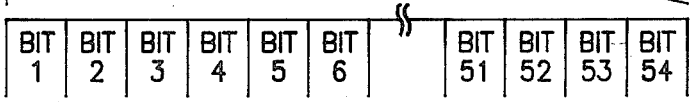

| HEXIDECIMAL ADDRESS LOCATIONS IN MEMORY | | |
|---|---|---|
| 0000 | COMMAND WORD 1 | 704 |
| 0001 | COMMAND WORD 2 | 706 |
| 0002 | MOST SIGNIFICANT BYTE OF START ADDRESS | 708 |
| 0003 | LEAST SIGNIFICANT BYTE OF START ADDRESS | 710 |
| 0004 | MOST SIGNIFICANT BYTE OF STOP ADDRESS | 712 |
| 0005 | LEAST SIGNIFICANT BYTE OF STOP ADDRESS | 714 |
| 0006 | M.S.B. OF MESSAGE 1 START ADDRESS | 716 |
| 0007 | L.S.B. OF MESSAGE 1 START ADDRESS | 718 |
| 0008 | M.S.B. OF MESSAGE 1 STOP ADDRESS | 720 |
| 0009 | L.S.B. OF MESSAGE 1 STOP ADDRESS | 722 |
| ⋮ | ⋮ | |
| 0012 | M.S.B. OF MESSAGE 4 START ADDRESS | 740 |
| 0013 | L.S.B. OF MESSAGE 4 START ADDRESS | 742 |
| 0014 | M.S.B. OF MESSAGE 4 STOP ADDRESS | 744 |
| 0015 | L.S.B. OF MESSAGE 4 STOP ADDRESS | 746 |
| 0016 | FIRST BYTE OF MESSAGE MEMORY SPACE | |
| ⋮ | ⋮ | |
| FFFF | LAST BYTE OF MESSAGE MEMORY SPACE | |

*FIG. 7*

COMMAND WORD 1 STRUCTURE

| BIT 0 | BIT 1 | BIT 2 | BIT 3 | BIT 4 | BIT 5 | BIT 6 | BIT 7 |
|---|---|---|---|---|---|---|---|

BIT 0: 0 = MESSAGE 1 UNREAD, 1 = MESSAGE 1 READ
BIT 1: 0 = MESSAGE 2 UNREAD, 1 = MESSAGE 2 READ
BIT 2: 0 = MESSAGE 3 UNREAD, 1 = MESSAGE 3 READ
BIT 3: 0 = MESSAGE 4 UNREAD, 1 = MESSAGE 4 READ
BIT 4: 1 = MESSAGE AREAS 1 AND 2 MERGED
BIT 5: 1 = MESSAGE AREAS 3 AND 4 MERGED
BITS 6 AND 7: LPC DATA RATE
   00: LPC DATA RATE = 2400 BITS PER SECOND
   01: LPC DATA RATE = 4800 BITS PER SECOND
   10: LPC DATA RATE = 7200 BITS PER SECOND
   11: LPC DATA RATE = 9600 BITS PER SECOND

*FIG. 8A*

COMMAND WORD 2 STRUCTURE

| BIT 0 | BIT 1 | BIT 2 | BIT 3 | BIT 4 | BIT 5 | BIT 6 | BIT 7 |
|---|---|---|---|---|---|---|---|

BITS 0 AND 1 DENOTE OLDEST MESSAGE IN MEMORY
BITS 2 AND 3 DENOTE SECOND OLDEST MESSAGE IN MEMORY
BITS 4 AND 5 DENOTE THIRD OLDEST MESSAGE IN MEMORY
BITS 6 AND 7 DENOTE LAST MESSAGE STORED IN MEMORY
FOR EACH TWO BIT MEMORY COMBINATION:
   BIT PATTERN 00 DENOTES MESSAGE AREA 1
   BIT PATTERN 01 DENOTES MESSAGE AREA 2
   BIT PATTERN 10 DENOTES MESSAGE AREA 3
   BIT PATTERN 11 DENOTES MESSAGE AREA 4

*FIG.8B*

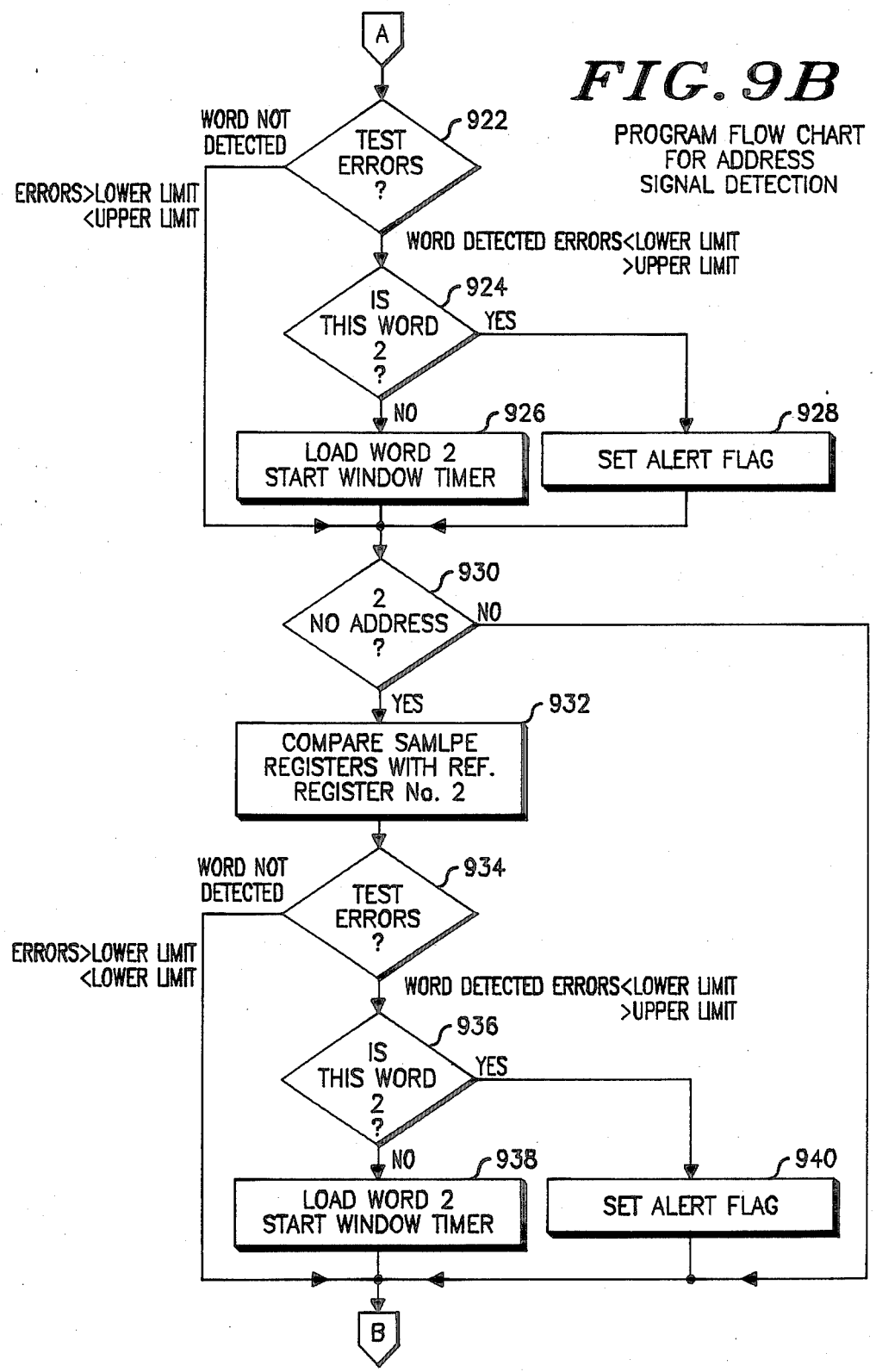

PROGRAM FLOW CHART
FOR ADDRESS DECODER
MICROCOMPUTER
SUB-ROUTINE THAT
LOADS SPEECH
DATA INTO MEMORY

PROGRAM FLOW CHART
FOR MICROCONTROLLER
IN SPEECH SYNTHESIZER

PAGING SYSTEM USING LPC SPEECH ENCODING WITH AN ADAPTIVE BIT RATE

This is a continuation of application Ser. No. 06/815,474, now abandoned, filed 12/31/85.

FIELD OF THE INVENTION

This invention relates to the field of paging systems and particularly to a paging system which utilizes LPC encoding for the transmission of voice messages over an RF link. The LPC portion of the system operates with an adaptive bit rate wherein a slower LPC bit rate is used to encode the voice messages during periods of high system loading so that a maximum number of users may be accomodated. If system constraints allow, a higher LPC bit rate is used to provide maximum speech quality.

BACKGROUND OF THE INVENTION

Digital systems are being developed for use with voice communication applications. Typical digital voice systems in the past have relied on encoding techniques which require high data transission rates to achieve an acceptable quality of voice. Because of the tremendous amount of information required to represent a voice signal, some systems require large memorys if a digital voice signal is to be stored for later use. One voice encoding technique is referred to as CVSD and it provides good quality of voice but at the expense of a large amount of data at a high data rate. LPC speech encoding is by far the most efficient technique for digitally encoding speech, and offers considerable advantages over CVSD and other techniques. It is well known in the art that the quality of LPC encoded and decoded voice signals can be improved by transmitting the LPC parameters at a higher bit rate. Present technology gives good voice quality for LPC parameter encoding at 2400 bits per second, and excellent speech quality when clock rates of 4800 bits per second (or more) are used.

Now, typical paging systems are highly loaded during the off-hours, from 6 PM to 8 AM, and become fully loaded during the peak hours of 9 AM to 4 PM.

It is desirable and possible to use 2400 BPS LPC encoding in conjunction with 12000 BPS digital modulation to achieve good voice quality and a high system message throughput during the busy hours of the day. The use of this LPC compression technique would give the system roughly five times the throughput during the peak load periods.

However, during the off-hours when the system is not fully loaded, the five to one throughput improvement is not needed, and it is desirable to use a higher LPC data rate to obtain improved voice message quality. Alternatively, it is also desirable to use different LPC bit rates to provide different voice quality levels for different tariffs. Thus, this invention provides a system and paging receiver in which the LPC analysis generates data at different bit rates (for example, 2400 BPS and 4800 BPS), transmits the data at an accelerated bit rate (for example, 12K BPS), and provides different levels of voice quality at the receiver.

SUMMARY AND OBJECTS OF THE INVENTION

In summary, the present invention the present invention includes a paging terminal which provides an LPC encoded speech output having an adaptive bit rate. The LPC bit rate is adaptively modified based on system airtime loading. Synthesizer circuitry in the paging receiver, together with the system signalling used to update the receivers as to the LPC bit rate, allows the paging receiver to decode the adaptive bit rate signal.

Accordingly, it is an object of the present invention to provide a paging system which adaptively modifies the transmission data rate to accomodate a larger volume of paging traffic.

It is another object of the present invention to provide for better use of a paging channel during off-hours by adjusting the system to improve voice quality in an LPC system.

It is still another object of the present invention to provide a paging system which allows for different grades of voice quality that can be tariffed at different rates.

BRIEF DESCRIPTION OF THE DRAWINGS

FIGS. 5A, 5B, 5C, 5D and 5E are timing diagrams showing a paging signalling scheme incorporating the selective signalling and formatted LPC digital voice information processed by the paging receiver of the present invention.

FIG. 7 is a memory map detailing the memory allocation and operation of the dual port memory described in conjunction with FIG. 6.

FIGS. 8A and 8B are diagrams detailing the format of the command words described in conjunction with FIG. 7.

FIGS. 9A, 9B, and 9C ared flow diagram detailing the method by which the address decoder of FIG. 6 decodes the address signal of FIG. 5B.

DETAILED DESCRIPTION OF DRAWINGS

According to the principles of the present invention, the loading for paging systems is highly dependent on the time of day because the primary users for paging systems are primarily active during conventional business hours. Other users require their pagers to be active 24 hours a day and these users account for most of the system loading during 'off-hour' periods. The system loading for a typical paging system is graphically shown in FIG. 1. Early morning hours, 12 AM-6 AM are usually lightly loaded times. As the day progresses, loading gradually increases until peak loading occurs between 10 AM-4 PM. System loading then gradually decreases and the cycle repeats.

Figure 2:
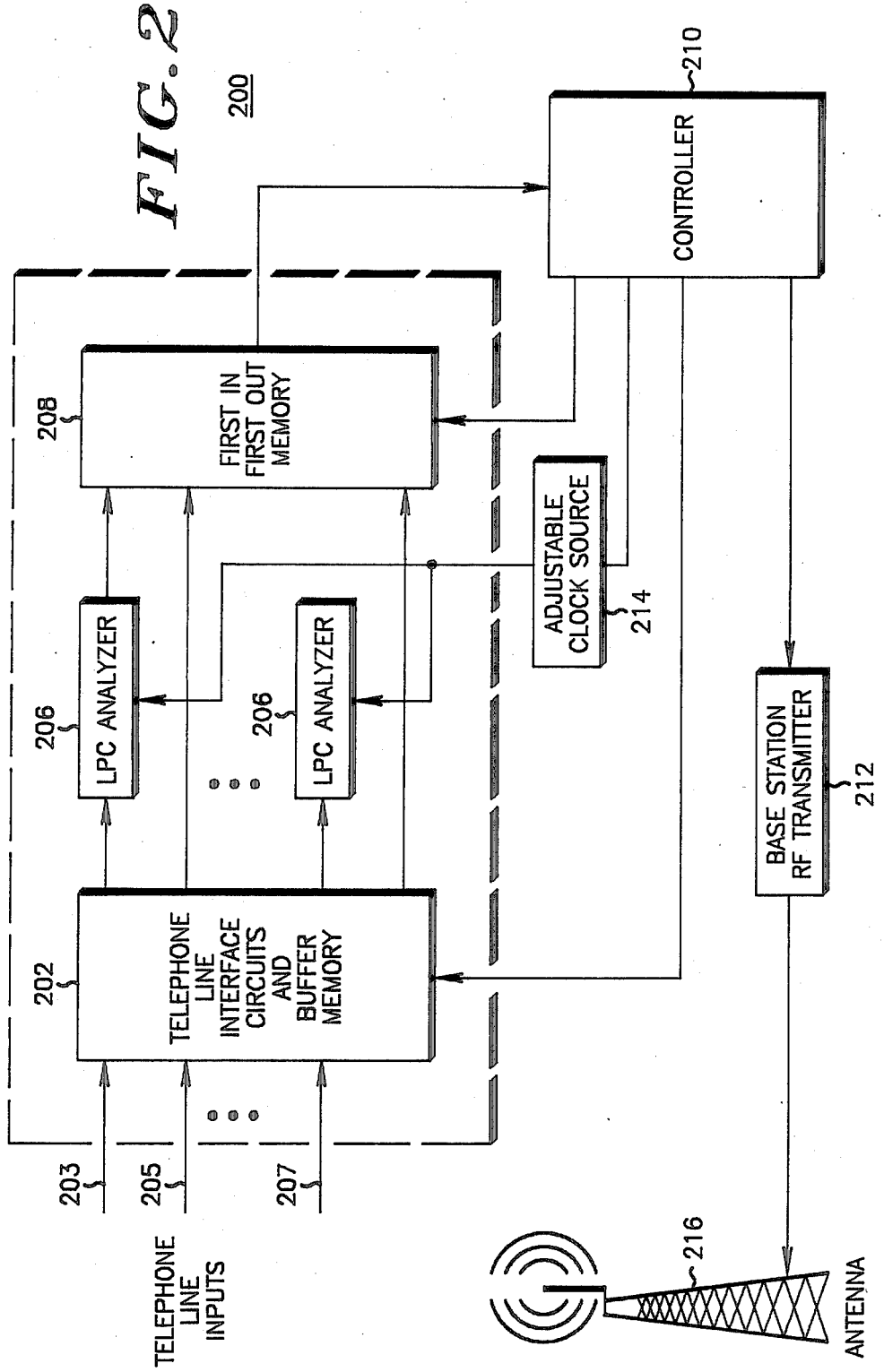
FIG. 2 is a block diagram of the encoder, base station, and transmitting portion of the paging system of the present invention.

The base station and transmitting portion 200 of the present invention is shown in FIG. 2. In operation, incoming voice messages are received via telephone line inputs 203, 205, 207, are processed by standard telephone-line interface circuits 202 and then temporarily recorded, either on tape or in an electronic memory, i.e. in a buffer memory. The standard telephone interface and buffer memory portions of 202 are referred to as a voice store and forward system and is described in detail in Motorola Instruction No. 68P81105C25, entitled, "Voice Store And Forward Modax Plus/Metro-Page", available from Motorola Paging Division, Paging Terminals Documentation, 1500 N.W. 22nd Ave., Boynton Beach, Fl., 33435.

Then, the message are retrieved from the buffer memory 202 and are processed by LPC analysis circuits 206 that analyze the voice signal and generate the digital LPS parameter that correspond to the input voice signal. According to the principles of the present invention, the data rate of the LPC parameters is a function of the clock signal used to drive the LPC analyzer.

In the context of the present invention, the LPC analyzers generate a low output bit rate—for example, 2400 BPS—when the system is highly loaded, and generate a higher bit rate when the system is highly loaded. The LPC data rate is determined by a controller 210 which appropriately adjust the clock in accordance with the system loading or the time of day.

In operation, the controller 210 generates the messages to the paging receivers in the form of an address signal followed by the LPC data transmitted at an accelerated rate. The exact format of the combined signalling and LPC data message is shown in detail below in conjunction with FIG. 5. In addition, a control word is transmitted after the address word, and before the LPC data, to indicate the bit rate at which the data was encoded. Alternatively, the controller 210 can simply transmit a signal to all paging receivers whenever it changes the encoding bit rate so that the synthesizer circuitry in the receiver will use the appropriate clock rate to reproduce the encoded speech signals. Controllers that perform these functions in paging systems are generally computer based and are well known in the art.

In the LPC speech system of the present invention, the intent is to provide a technique in which several speech messages can be transmitted in the time presently required to transmit one message. Presently, only about 1,000 users can effectively be placed on a tone and voice paging system. With an LPC technique using a 2400 BPS representation of a speech signal, a 5:1 improvement in throughput could be achieved by transmitting the output speech data at 12,000 BPS.

As mentioned above, at the telephone interface and buffer memory 202 speech signal from the phone line inputs 203, 205, and 207 are stored temporarily in a storage memory. This is done to handle high peak input loads without requiring a large number of expensive LPC analyzers. The stored voice samples are retrieved from the memory under the direction of the controller 210 which in practice is a microcomputer. The analog speech signals—or the reconstructed analog speech signals—are analyzed, and the LPC analyzers 206 generate a digital bit stream of LPC parameters (pitch, gain, filter parameter) that represents the speech signal. The LPC encoded messages are accumulated in a FIPO memory 208 to be reproduced in the order in which they were generated. The output of the FIFO memory 208 is coupled to the controller 210 which generates the composite paging signal comprising signalling and LPC data for transmission by the base station RF transmitter 212. An LPC analyzer suitable for use with the present invention is described in U.S. Pat. No. 4,378,469, filed May 26, 1981, entitled "Human Voice Analyzing Apparatus", invented by Bruce Fette and assigned to the assignee of the present invention. Speech analyzers are also discussed in an article entitled "Digital Voice Transmission and Linear Predictive Coding" by Bruce Fette, *Correlations*, Fall 1979. The Correlations publication is published by and is available from the Government Electronics Division of Motorola, Inc. Phoenix, Ariz.

Typically, the LPC bit stream will be capable of accurately representing the input voice signals with a low bit rate of about 2400 BPS. Thus, if the transmitter uses 12,000 BPS modulation, a 5 to 1 improvement in RF channel efficiency can be achieved. Thus, an RF channel could transmit five times as much voice information per unit time as today's analog systems. In the LPC system of the present invention, the system throughput or the number of pages transmitted per unit time is defined as follows:

$$\frac{(\text{Average Message Length})(LPC \text{ Bit Rate})}{(\text{Transmitted Bit Rate})}$$

Thus, if: transmitted bit rate=12K BPS, LPC bit rate=2400 BPS

Average Message Length = 10 seconds

Pages per second =

$$\frac{(10)(2,400)}{12,000} = 2 \text{ seconds}$$

or the system takes only two second to send the average ten-second message.

It is well known that the quality of LPC encoded speech can be increased by increasing the bit rate of the LPC data. In off-pack hours, a typical paging system is not fully loaded, but may only be used at 25% or less of the peak channel capacity. The LPC system of the present invention is configured to change the LPC data rate based on system loading, to increase the data rate, and thus provide improved speech quality in off-peak hours. Specifically, the adjustable clock source 214 can be varied to provide four LPC encoding rates of 2400, 4800, 7200, and 9600 bit per second.

Figure 3:
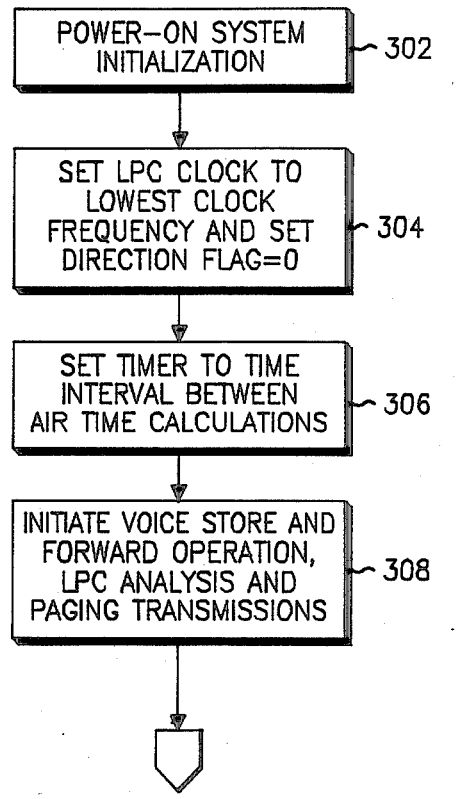
FIG. 3 is a flow diagram detailing the operation of the background routine of the controller 210.

FIG. 3 is a flow diagram detailing the overall opertion of the controller 210 of FIG. 2. The routine 300 is activated on power-up at 302. Item 304 then generates the variable signal which controls the adjustable clock 214, to generated the lowest LPC bit rate. Item 306 initializes to time an interval between airtime calculations. The airtime interval is the time period between LPC bit rate calculations. Item 308 corresponds to normal system operation in which voice messages are fetched from the telephone interface and buffer memory 202, LPC encoded and combined with paging signalling information. The operation of item 308 is analagous in operation to a conventional binary paging encoder and base station. It will be recognized by those skilled in the art that the adjustable clock source can be implemented in several ways. One method would be to simply use an oscillator and a programmable divider, the output clock frequency controlled by varying the division ratio of the divider.

Figure 4A:
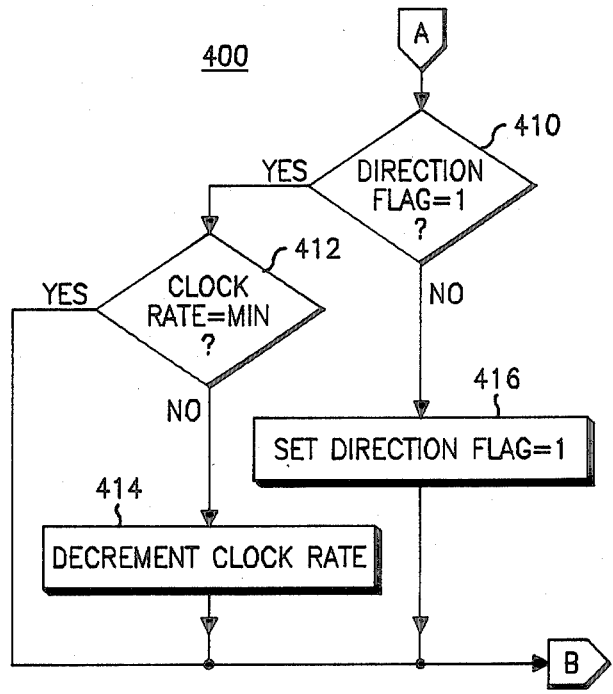
FIG. 4 is a flow diagram showing a subroutine for monitoring channel utilization of the paging system.
Figure 4B:
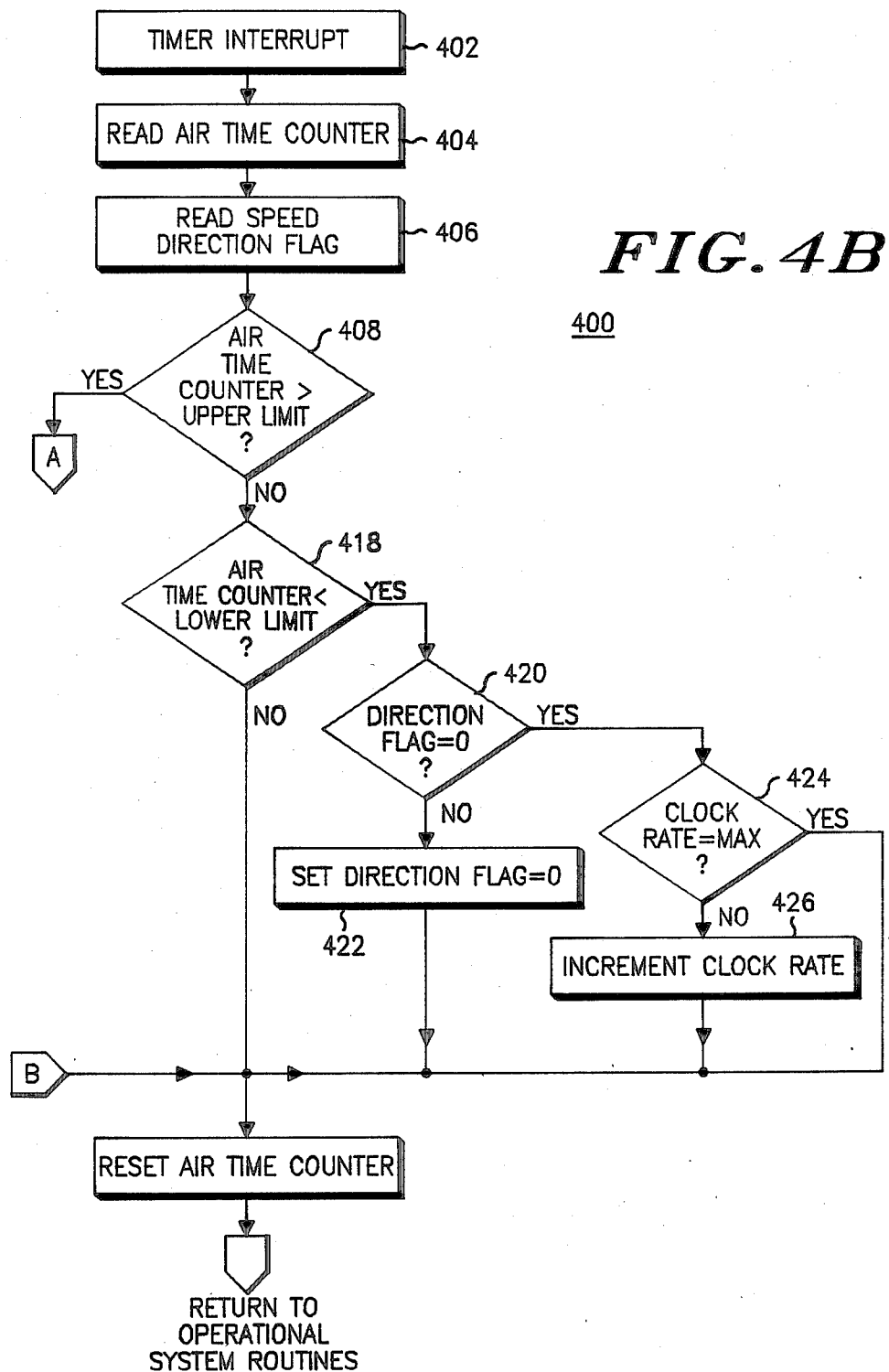

FIG. 4 is a flow diagram showing a subroutine for monitoring paging system loading and adaptively generating the variable signal which adjusts the paging system LPC bit rate. The routine 400 is activated by the timer interrupt which was initialized by item 306 of FIG. 3. When the timer 306 times-out, the interrupt 402 acitivates the routine 400. Item 404 reads the airtime counter, which is a software timer that measures elapsed air time since the last reset signal, to determine the average airtime for the last period. Item 406 then reads a speed direction flag. The speed direction flag indicates whether system loading is relatively increasing or decreasing. Decision 408 then determines whether the current value of the airtime counter 404 exceeds a predefined upper limit. If the upper limit is exceed, decision 410 examines the direction flag to determine whether loading is increasing or decreasing. If loading is increasing, the direction will be set to a binary 1. Decision 412 is selected by decision 410 is loading is increasing and the direction flag is set of one. In this manner, two consecutive periods of increasing load must be tested before the LPC encoding rate is modified. Decision 412 determines whether the clock rate is already set at minimum. If the LPC bit rate is already at a minimum, item 428 is selected to reset the airtime counter. If the LPC bit rate is not at a minimum, item 414 decrements the LPC bit rate before item 428 to reset the airtime counter. As mentioned above, increasing must be detected over two periods before the LPC bit rate is modified. Therefore, decision 410 selects item 416 to set the direction flag if it was not set on the previous pass.

Decision 418 is selected if decision 408 tested negative, that is, if the upper airtime limit was not exceeded. Decision 418 tests the value of the airtime counter against a lower limit value. If the airtime counter is not less than the lower limit, item 428 is selected to reset the airtime counter. If the lower limit tested YES, decision 420 determines whether the direction flag has been set. If the direction flag was set, item 422 is selected to set the direction flag to zero. If the direction flag was not set, decision 424 determines whether the LPC bit rate is at a maximum. If so, item 428 is selected to reset the airtime counter. If the LPC bit rate can be increased, item 426 is selected to increment the clock rate, item 428 then resets the airtime counter before returning to normal system operation.

FIGS. 5A through 5E are a series of timing diagrams which detail a signalling scheme that could be used to communicate signalling and voice information to the paging receiver of the present invention. FIG. 5A shows the overall format of the paging messages. According to FIG. 5A, a typical paging message would include an address signal followed by a digital encoded LPC voice signal. And end-of-message (EOM) signal terminates the message.

FIG. 5B is an expanded representation of the address signal described above in conjunction with FIG. 5B. The preferred embodiment of the present invention employs a dual word address signalling scheme which is well known to those of ordinary skill in the art. This address signalling scheme, referred to as 'Echo' code is described in detail in U.S. Pat. No. 4,5218,961, cited above. As shown in FIG. 2B, the address signal is formatted as two digital 23 bit words that consist of 12 bit information bits, followed by an 11 bit parity bits. The first digital word, comprising the information and parity words, is referred to as the 'A' address. The second word is referred to as the 'B' address. The 'A' address and the 'B' address are separated by a ½ bit timing space. The 'A' address and the 'B' address may be combined in several ways to provide multi-function signalling to the paging device, as shown in the cited reference. Briefly, by detecting the reception of words A and B, or their binary complements, four different functions can be provided for any assigned sets of A and B. While the preferred embodiment of the present invention is disclosed in the context of the 'Echo' code, those skilled in the art will appreciate that many other address signalling schemes would also function satisfactorily.

FIG. 5C shows the structure of teh LPC bit rate code word that is used to indicate to the paging receiver the LPC bit rate that was used to encode the voice message. The bit rate code word is a six bit pattern that simply repeats three times the two bit binary coding for the bit rate. Thus the pattern 000000 denotes the lowest bit rate, or 2400 BPS, the pattern 010101 denotes 4800 BPS, 101010 denotes 7200 BPS, and the pattern 111111 denotes 9600 BPS.

FIG. 5D is a timing diagram showing the format of the digitally encoded voice signal described above in conjunction with FIG. 5A. The present invention utilizes a well known LPC encoding format referred to as LPC-10. This LPC format was developed by the Department of Defense, and is discussed in detail in an article by Thomas E. Tremain, entitled "The Government Standard Linear Predictive Coding Algorithm; LPC-10" appearing in Speech Technology, p. 40, April 1982. As shown in FIG. 5D, the digitally encoded speech signal is formatted as a group of LPC data frames comprised of a predetermined number of bits. LPC-10 employs frames having 54 bits as shown in FIG. 5F. Each frame of LPC data contains one set of LPC parameters which are defined below in Table 1.

Table 1 is a table which defines the function of each bit (per frame) as shown above in FIG. 5E. Table 1 is a reproduction of the contents of a table which was published in Tremain's article mentioned above.

TABLE 1

| | Transmitted Bit Stream | | | | |
|---|---|---|---|---|---|
| Bit | Voiced | Unvoiced | Bit | Voiced | Unvoiced |
| 1 | K1-0 | K1-0 | 28 | K2-4 | K2-4 |
| 2 | K2-0 | K2-0 | 29 | K7-0 | K3-5 |
| 3 | K3-0 | K3-0 | 30 | K8-0 | R-5 |
| 4 | P-0 | P-0 | 31 | P-4 | P-4 |
| 5 | R-0 | R-0 | 32 | K4-4 | K4-4 |
| 6 | K1-1 | K1-1 | 33 | K5-0 | K1-5 |
| 7 | K2-1 | K2-1 | 34 | K6-0 | K2-5 |
| 8 | K3-1 | K3-1 | 35 | K7-1 | K3-6 |
| 9 | P-1 | P-1 | 36 | K10-0 | K4-5 |
| 10 | R-1 | R-1 | 37 | K8-1 | R-6 |
| 11 | K1-2 | K1-2 | 38 | K5-1 | K1-6 |
| 12 | K4-0 | K4-0 | 39 | K6-1 | K2-6 |
| 13 | K3-2 | K3-2 | 40 | K7-2 | K3-7 |
| 14 | R-2 | R-2 | 41 | K9-0 | K4-6 |
| 15 | P-2 | P-2 | 42 | P-5 | P-5 |
| 16 | K4-1 | K4-1 | 43 | K5-2 | K1-7 |
| 17 | K1-3 | K1-3 | 44 | K6-2 | K2-7 |
| 18 | K2-2 | K2-2 | 45 | K10-1 | D/C |
| 19 | K3-3 | K3-3 | 46 | K8-2 | R-7 |
| 20 | K4-2 | K4-2 | 47 | P-6 | P-6 |
| 21 | R-3 | R-3 | 48 | K9-1 | K4-7 |
| 22 | K1-4 | K1-4 | 49 | K5-3 | K1-8 |

TABLE 1-continued

| Bit | Transmitted Bit Stream Voiced | Unvoiced | Bit | Voiced | Unvoiced |
|---|---|---|---|---|---|
| 23 | K2-3 | K2-3 | 50 | K6-3 | K2-8 |
| 24 | K3-4 | K3-4 | 51 | K7-3 | K3-8 |
| 25 | K4-3 | K4-3 | 52 | K9-2 | K4-8 |
| 26 | R-4 | R-4 | 53 | K8-3 | R-8 |
| 27 | P-3 | P-3 | 54 | Sync | Sync | where:
Bit 0 is LSB
Order of transmission is bit 1 to bit 54
P is pitch
R is RMS
K is reflection coefficients
Bit 0 is LSB of voice data
Bit 5 is LSB of parity for RMS and reflection coefficients According to Table 1, each frame contains the information necessary to communicate information about the excitation source and 10 LPC reflection coefficients per frame. Each LPC reflection coefficient is defined according to bits represented as Kn ifn Table 1. Each reflection coefficient is complemented by a 'P' bit which indicates pitch and an 'R' bit which indicates RMS power. The last bit of the frame is reserved for synchronization. The LPC-10 excitation and reflection coefficient information shown in Table 1 can be used to reconstruct the original speech message, and the method of performing this reconstruction is well known in the art.

While the preferred embodiment of the present invention relys on LPC-10 signalling, other versions of LPC or other digital formats would work equally well. One technique such as CVSD encoding could be employed with a slight modification to the receiver and a significantly larger memory. The larger memory would be required because CVSD encoding is not a particularly efficient method of encoding speech.

Figure 6:
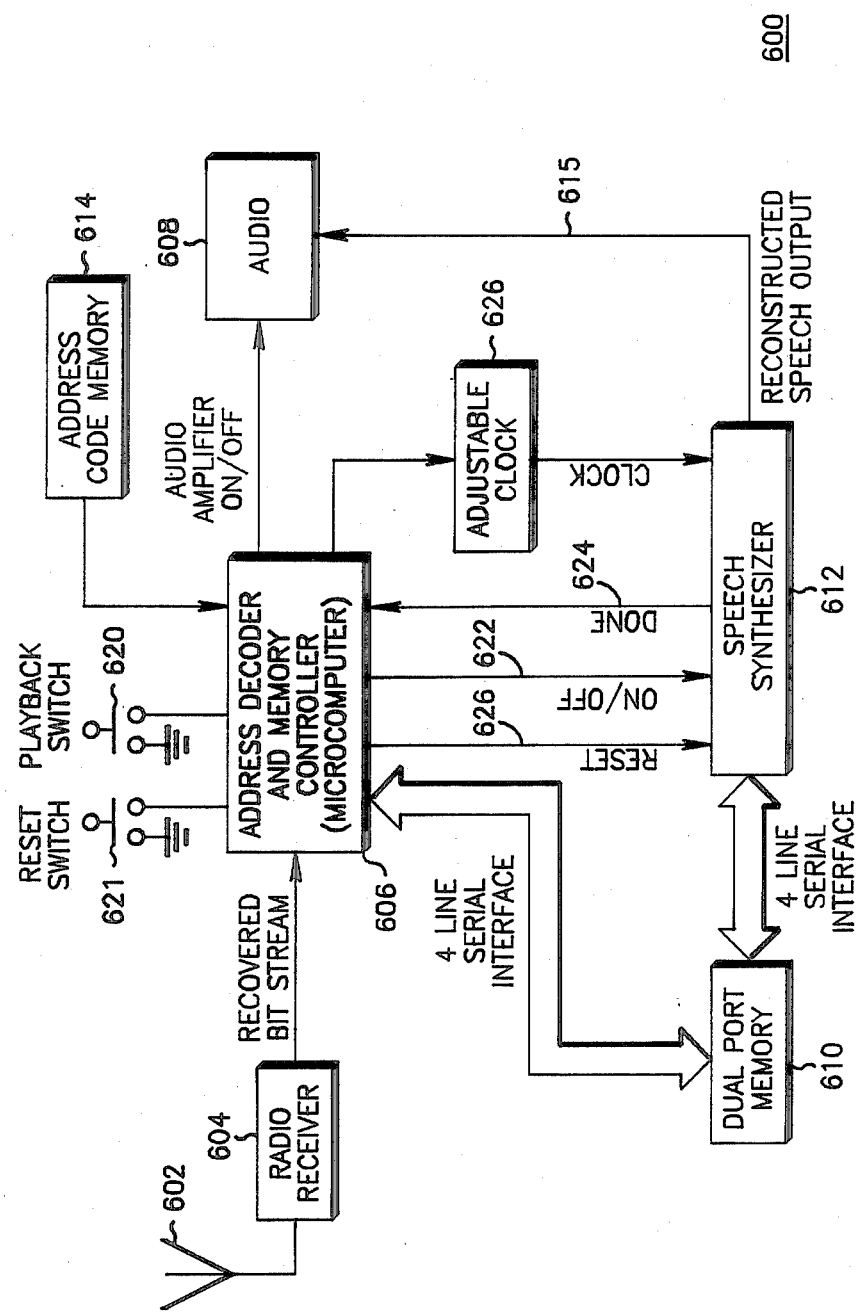
FIG. 6 is a block diagram of the paging receiver apparatus of the present invention.

FIG. 6 is a block diagram of the LPC paging receiver of the present invention. This structure allows LPC encoded speech signals to be received and stored in a memory for reconstruction and playback at the discretion of the paging user. Further, it also allows for the storage of more than one message, and allows one speech message to be played back while a new message is being received and stored. Further, the stored messages can be of variable length without wasting memory space for each message.

The paging receiver 600 includes a conventional radio receiver 604 and an antenna 602. The radio receiver 604 provides a recovered bit stream comprising the LPC encoded voice message as well as the pager address information. The recovered bit stream is processed by an address decoder 606 which also controls the overall operation of the paging receiver. The address decoder 606 is further coupled to a address code memory 614, a audio circuit 608, a dual port memory 610, and a speech synthesizer 612. An adjustable clock source 626 has its control input coupled to the address controller 606, and its clock output terminal coupled to the speech synthesizer. The address code memory 614 contains the pager identification number(s) which are used to selectively signal the particular paging devices. The dual port memory 610 is used to store the LPC encoded voice messages. The features and advantages of the dual port memory, as employed by the present invention will be discussed more fully below. The speech synthesizer 612 is coupled to both the dual port memory and the microprocessor 606 for reasons which will be discussed in detail below. Briefly however, the address decoder acts as a selective signalling decoder that decoder the address signal and the LPC bit rate code word, and that stores the LPC bit rate and encoded signals that are addressed to the individual pager, and control the bit rate of the synthesizer. The speech synthesizer reads the LPC encoded signals stored in the dual port memory 610 and converts them to an analog voice signal which is processed by audio circuitry 608.

While the combination of the elements which comprise the paging receiver of the present invention is unique and novel in the art, several of the elements used to construct the paging reciever of the present invention are well known to those skilled in the art.

For example, the radio receiver 604 may be a conventional FM receiver adapted to provide a basedband output. The address decoder 606 may be a microprocessor device such as a MC146805C4, manufactured by, and available from The Microcomputer Division of Motorola Semiconductor Products Inc., with headquarters in Austin, Tex. The address code memory may be a conventional read-only memory (ROM). A paging receiver having a microcomputer based decoder suitable for use with the present invention is described in U.S. Pat. No. 4,518,961 entitled "Universal Paging Device With Power Conservation" filed Jan. 30, 1984, invented by Walter L. Davis et al., and assigned to the assignee of the present invention. The dual port memory is a random access memory (RAM) which may be accessed from either of two ports. This device could be of the type TMS4161 available from Texas Instruments of Dallas, Tex.

While the teachings of the present invention are set forth in the context of LPC encoded speech, several digital speech encoding techniques could perform satisfactorily with the receiver structure of the present invention. The choice of speech synthesizers therefore depends on the type of speech encoding used. The preferred embodiment of the present invention utilizes a speech synthesizer of the type described in U.S. Pat. No. 4,389,537, filed Oct. 3, 1983 entitled "Voice Warning System for An Automotive Vehicle Provided With An Automatic Speed Control Device", invented by Tsunoda et al. For the forgoing, the above Patents, articles, and instruction manuals are herein incorporated by reference.

Referring still to FIG. 6, the operation of the paging receiver may be described as follows. The address decoder/controller 606 searches for an address signal (or signals) that indicate a message is being sent to the pager. The decoder/controller would typically be a multiaddress, multifunction decoder, and one or more of the addresses or functions would be associated with an LPC voice message. Multiaddress/multifunction decoders are further described in U.S. Pat. No. 4,518,961 cited above.

When the decoder/controller 106 receives one of the address signals that indicate an LPC encoded speech message is forth-coming, the address decoder decodes the LPC bit rate codeword and then activates the dual port memory 610 and serves to receive the incoming bit stream that comprises the speech messages and store it in the dual port memory 610 via one of its' input ports. After the entire speech message has been received, the decoder/controller 606 turns on the audio amplifier (or a similar alerting device) and generates an output signal to indicate that a message has been received.

When the user wishes to listen to the stored voice message, he activates a "listen" or playback control 620 that has an input to the address decoder. This input causes the decoder/controller to read the LPC bit rate which is stored in the first six bits of each message, establish the proper clock rate for the adjustable clock and to turn ON the synthesizer via the ON/OFF control line 622. The synthesizer then reproduces the stored voice message through the audio circuit 608, in accordance with instructions deposited in the memory by the decoder/controller 606.

Referring now to FIG. 7, there is shown a memory map detailing the operation of the dual port memory 610 described above in conjunction with FIG. 6. According to FIG. 7, there are six memory locations 704, 706, 708, 710, 712, and 714 in the dual port memory that serve as a "scratch pad" communications link between the decoder/controller 306 and the speech synthesizer 612. The memory locations represented by blocks 704, 706, 708, 710, 712, and 714 are written into by decoder/controller before it turns on the speech synthesizer 612. The memory locations 704 and 706 represent the first two byte control words. A two byte starting address location is represented by 708 and 710, and a two byte stop address location is represented by memory locations 712 and 714. The memory locations with hexidecimal addresses 0006 through 0015 and labeled 716 through 746, respectively, are used to store the start and stop locations of each of the four messages that can be stored in the memory. The remaining memory locations 0016 to FFFF are used to store the variable length LPC voice messages made possible by the memory structure of the present paging receiver. The memory map shown in FIG. 7 is based on the assumption that the paging receiver is constructed with a receiver having an 8 bit microprocessor with a 64K bit random access memory. Those skilled in the art will appreciate that the receiver structure of the present invention may be expanded to include microcessors and memorys using any number of bits.

In operation, the address decoder and memory controller 606 reads and updates the information stored in command word locations 704, and 706 and instructs the speech synthesizer to "talk" or reproduce the speech data contained between the starting address location stored in 708, 710 and the stopping address location stored in 712, and 714. The information contained in the starting and stopping address fields may also be updated at the same time the command words 704, 706 are updated. The decoder/controller 606 then activates the speech synthesizer 612 by raising the ON/OFF output line 622 to a high or ON state. Upon being turned ON, the memory controller portion of the synthesizer 612 accesses the dual port memory 610 and reads the command wordss 704, 706. It then reads the starting and stopping address locations, and reproduces the speech message stored in the memory between the starting and stopping address locations.

The memory conserving technique described above has several advantages. First, it conserves memory in that memory is not wasted as it would be if there were fixed memory boundaries, and a short message was received. Second, it allows for variable length messages to be stored. That is, there are no fixed constraints on message length other than the total size of memory. Third, the synthesizer does not have to be programmed with any prior information about the starting and stopping locations of all message locations. Finally, the systems allows extra memories, both RAM and ROM, to be added without affecting the design or programming of the synthesizer. Thus, the system can be used to reproduce canned messages out of a ROM as well as real time received messages. Furthermore, because of the unique dual-port memory structure, the receiver can receive and store one message while a previous is being reproduced.

FIGS. 8A and 8B are diagrams detailing the format of the command words described in conjunction with FIG. 7. The control words shown in FIGS. 8A and 8B are used to inform the memory control circuitry as to the data rate and location of the stored LPC voice messages. In addition, the first control word is used to store status information indicating whether paticular messages have been 'read' previously. Referring now to FIG. 8A, the first command word comprises an 8 bit field. Bits 0 to Bit 3 store message status information. For example, if bit 1 is a zero, message one has not been read. If bit one is a binary 1, then message 1 has been read. Bits 4 and 5 are used to facilitate the storage of very long messages and the status of the field formed by bits 4 and 5 allow the message areas to be merged in any combination. Bits 6 and 7 are used to indicate the data rate of the LPC voice message. The bits are used in systems which employ variable bit rate speech encoding and they may be omitted or ignored in fixed data rate systems.

Referring now to FIG. 8B, the command word 2 structure is shown in detail. The command word 2 is used to indicate the chronological order or each stored message. Bits 0 and 1 denote the oldest message stored in memory. Bits 2 and 3 denote the second oldest message in memory. Bits 4 and 5 denote the third oldest message in memory. Bits 6 and 7 denote the last message stored in memory. Each two bit field will show the following bit pattern. Bit pattern 00 denotes message area 1. Bit pattern 01 denotes message area 2. Bit pattern 10 denotes message area 3. Bit pattern 11 denotes message area 4. The retention of historical data on message permits the user to discard the older messages if additional memory is required for other messages.

Figure 9A:
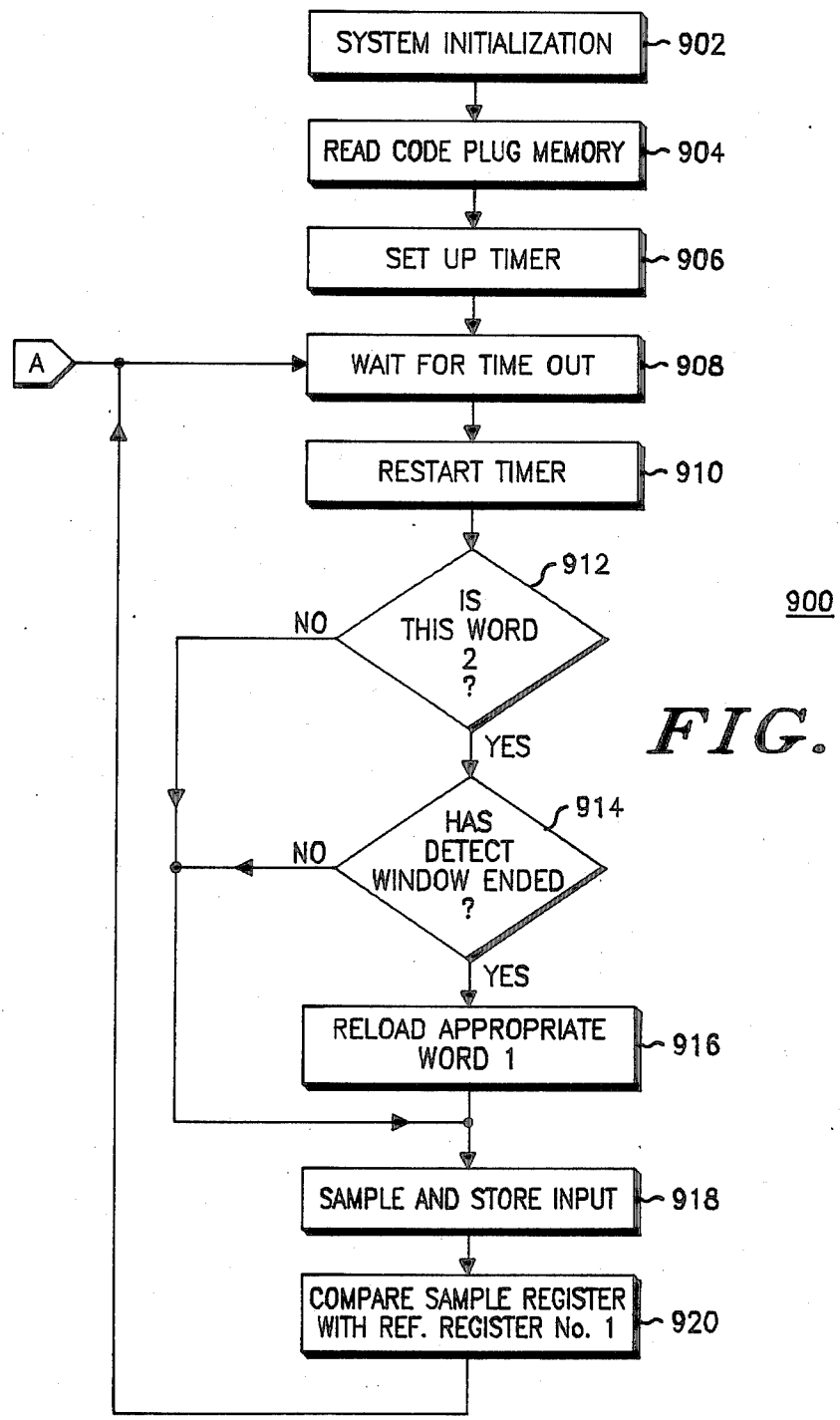

Referring now to FIG. 9A, there is a flow diagram detailing the operation of the address decoder 606 of FIG. 6 as it relates to the decoding of the dual word address signalling scheme employed by the present invention. The routine 900 is activated when the device is turned-on, and the system is then initialized at 902. Item 904 is then selected to read the address code memory for the unique paging address or addresses corresponding to each particular paging device. The contents of the address code memory are then stored in a RAM location defined as the reference register. A timer is set by item 906 to establish the bit sampling period described in detail in U.S. Pat. No. 4,518,961 mentioned above. Item 908 provides a wait for time out function and is used as part of an energy conservation technique. The output of waiting block 908 is connected to item 910 to restart the timer to time the interval to the next bit sample, and the address decoding algorithm is then executed using the updated signal sample set. The output of item 910 is coupled to decision block 912. Decision block 912 tests whether or not the current word being decoded is the second word of an address. The YES branch from decision 912 is connected to decision 914. Decision 914 determines whether or not the time window for detecting a word 2 has elapsed. The yes branch from decision 914 is connected to item 916 directing the reloading of address word one. The negative branches of decisions 912, and 914, along with the output of reload word one item 516 are connected to a sample and store input 918.

Block 918 is representative of the sampling and storing operation used to detect the address word for the individual paging device. The output of sample and store block 918 is connected to block 920 labeled compare sample register with reference register 1. As will be described in greater detail, reference register 1 at this point contains the pager address word. The output of compare block 920 is connected to a connect point labeled with the alphabetic character A which is replicated on FIG. 9B.

FIG. 9B shows point A connected to a decision block 922. The word detect branch from decision block 922 is connected to a second decision block 994 which determines whether or not this is a word 2. The negative branch from decision block 924 is connected to block 926 which orders the loading of word 2 and the restarting of the timer. The YES branch from decision block 924 is connected to a set alert flag block 928. The excessively high and lower limit branch from test error decision block 922, together with the output of the load word 2 and start timer block and the output of set alert flag block 928 are connected to a decision block 930.

The next series of tests and command blocks, which end at connect point B, are applicable to the detection of a second address, i.e., a second set of A and B code words. Paging receivers in the ECHO system may have two independent addresses and up to eight output or alert functions. Decision block 930 tests whether there is a second address code memory. The NO branch from decision block 930 is connected to connect point B. The YES branch of decision block 930 is connected to block 932 which compares the sample register with the reference in register 2. Register 2 contains the second independent address word. The output of compare block 932 is connected to decision block 934. Decision block 934 tests the error limit for the comparison operation commanded by block 932. The word detect branch from decision block 934 is connected to a decision block 936. Decision block 936 tests whether or not this is a second word. The NO branch from decision block 936 is connected to block 938 which causes the loading of word 2 and restarting of the timer. The YES branch of decision block 936 is connected to set alert flag block 940 to indicate that one of the functions associated with the second address has been detected. The excessively high or low limit branch from test error decision block 934, the output of load word 2 block 938 and the output of set alert flag block 940 are all connected to exit point B.

Figure 9C:
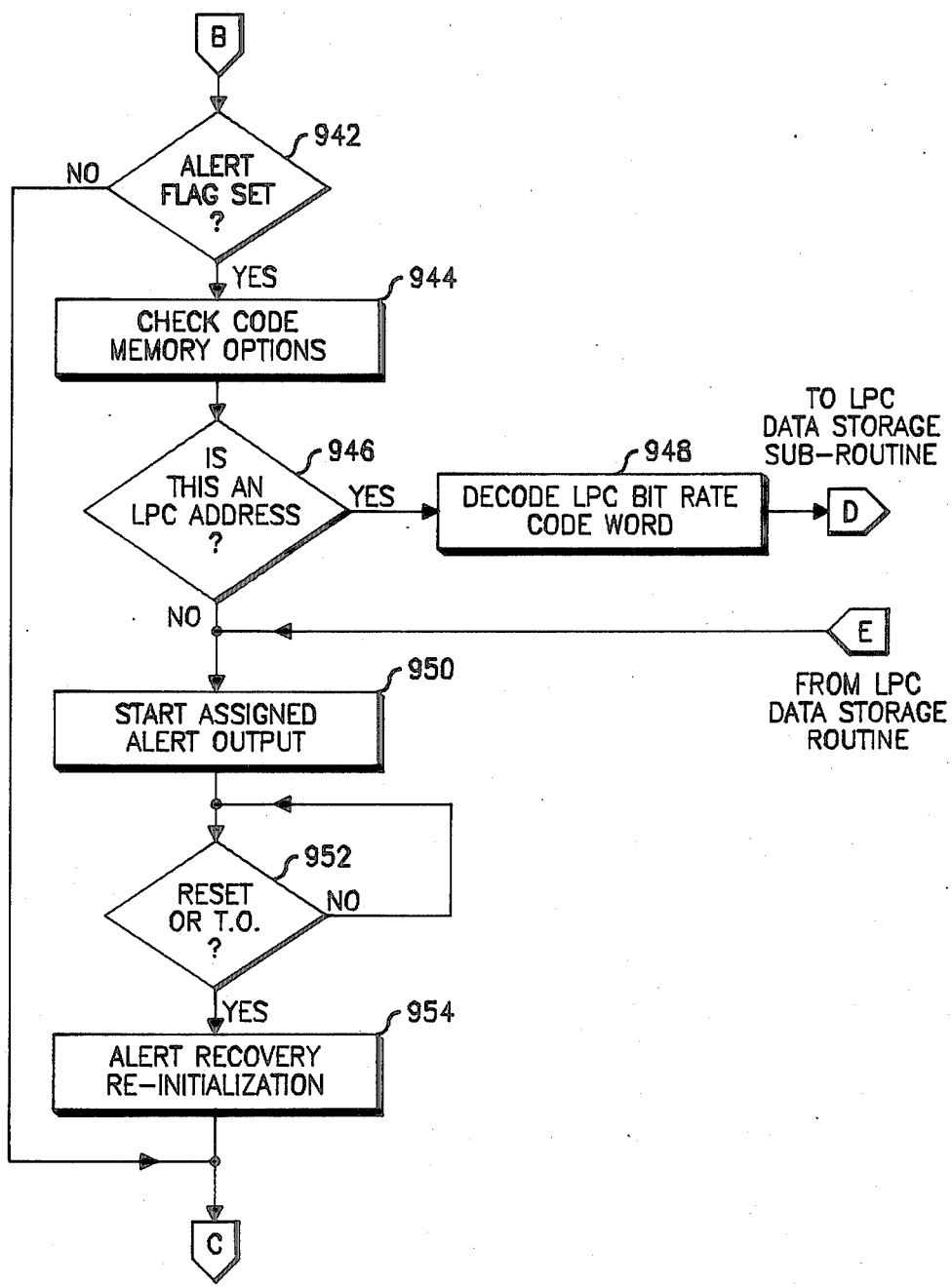
Figure 10:
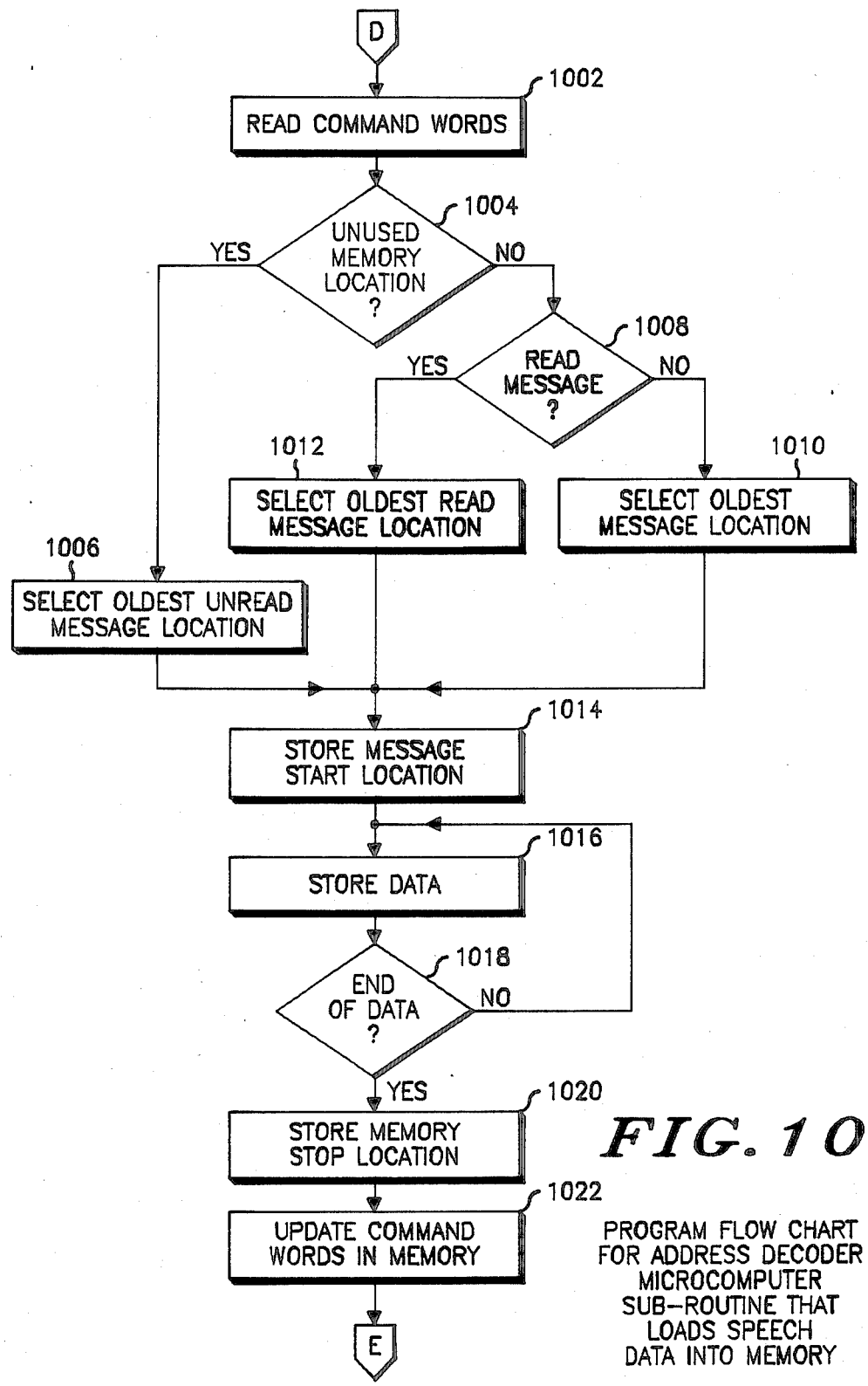
FIG. 10 is a flow diagram detailing the operation of the address decoder routine which loads speech data into the dual port memory of FIG. 6.

FIG. 9C shows point B connected to a decision block 942. Decision block 942 determines whether or not an alert flag has been set, that is whether or not a valid address signal has been detected. The YES branch from decision block 942 is connected to the check code memory options block 944. The output of block 944 is connected to decision block 946, which tests whether the detected address is associated within an LPC data transmission. The YES branch of block 946 is connected to point D which is connected to the subroutine in FIG. 10 that loads the LPC data into the memory. The NO output of block 946, together with the return path labelled E for the subroutine of FIG. 10, are connected to the start assigned alert output block 950. The output of block 950 is connected to decision block 952. Block 952 resets the alert output if an external reset signal is received, or if an automatic time out reset occurs. The negative branch of decision block 952 is connected back to its input. The YES branch of decision block 952 is connected to an alert recovery reinitialization block 954. The output of alert recovery block 954 is connected to point C that is also connected to the subroutine shown in FIG. 7 that monitors the reset and playback inputs to the address controller.

Functionally, the program represented by the flowchart directs the address controller to function to decode addresses in the manner detailed in the U.S. Pat. No. 4,518,961. Thus, after some turn-on initialization procedures that start at block 902, the program sequence directs the search for a word 1 that matches a word 1 stored in the code memory. Then it directs the search for a word 2 that must be detected within a narrow time window after the detection of word 1, otherwise, the decoder goes back to searching for word 1.

The program directs that the input be sampled at the appropriate time (block 908 through 918), and that the samples be stored in appropriate register (block 918). Then, the contents of the sample register are compared with the address or addresses contained in the code plug memory. In the steps represented by blocks 922, 924, 926 and 928, the samples are compared with an address word of a first address, and in the steps represented by blocks 932, 934, 936, 938, and 940, the sample registers are compared with a second address. This scheme thus permits eight possible combinations of sequential words and their inverses to be directed.

In each of the decoding steps, the program generates an alert signal if an assigned address signal is received, and this alert signal or flag is decoded in the section of the program represented by blocks 942, 944, 946, 950, and 952, and an appropriate alert signal is generated.

Figure 1:
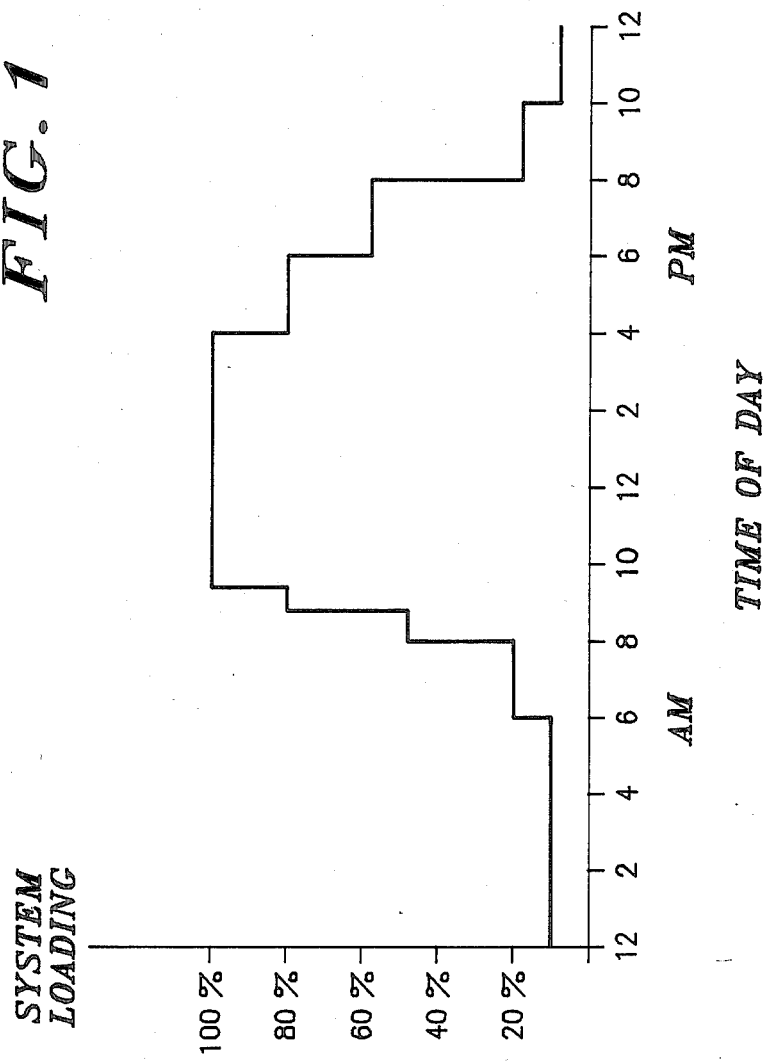
FIG. 1 is a graph showing a typical relationship between paging system loading vs. time of day.

FIG. 10 is a flow diagram detailing the operation of the address decoder routine 1000 which loads speech data into the dual port memory of FIG. 1. The routine 1000 is activated whenever a new LPC encoded speech message is received. Whenever the routine 1000 is activated via entry point D, item 1002 fetches the command words stored in the memory map 'scratch pad' area mentioned above. Decision 1004 determines whether any empty of unused message locations are currently available. If a message location is available, the routine branches to time 1006 which selects the oldest unread message location. If a new message location is not available, the routine must decide where to store the new message. The preferred embodiment of the present invention prioritizes messages based on whether old messages have been read or not. Other pritiorization schemes could also be employed and all such prioritization schemes are anticipated by the spirit of the teachings of this invention. Decision 1008 examines each message location to determine whether any messages have been read. If any message has been read, item 1012 selects the oldest read message location to store the new message. If no messages have been read, item 1010 selects the oldest mesage location for storage of the message. Each of the above decision paths ultimately selects item 1014 to update the memory start location indicator. Item 1016 stores the LPC voice message while decision 1018 continuoulsy checks the bits stream for the end of message pattern. When the message is complete, Item 1020 calculates the memory stop location and item 1022 updates the memory location indicators in the scratchpad area. Then, the subroutine returns to the main program at point E in FIG. 9C, and an alert is generated to indicate that a page has been received and stored.

Figure 11:
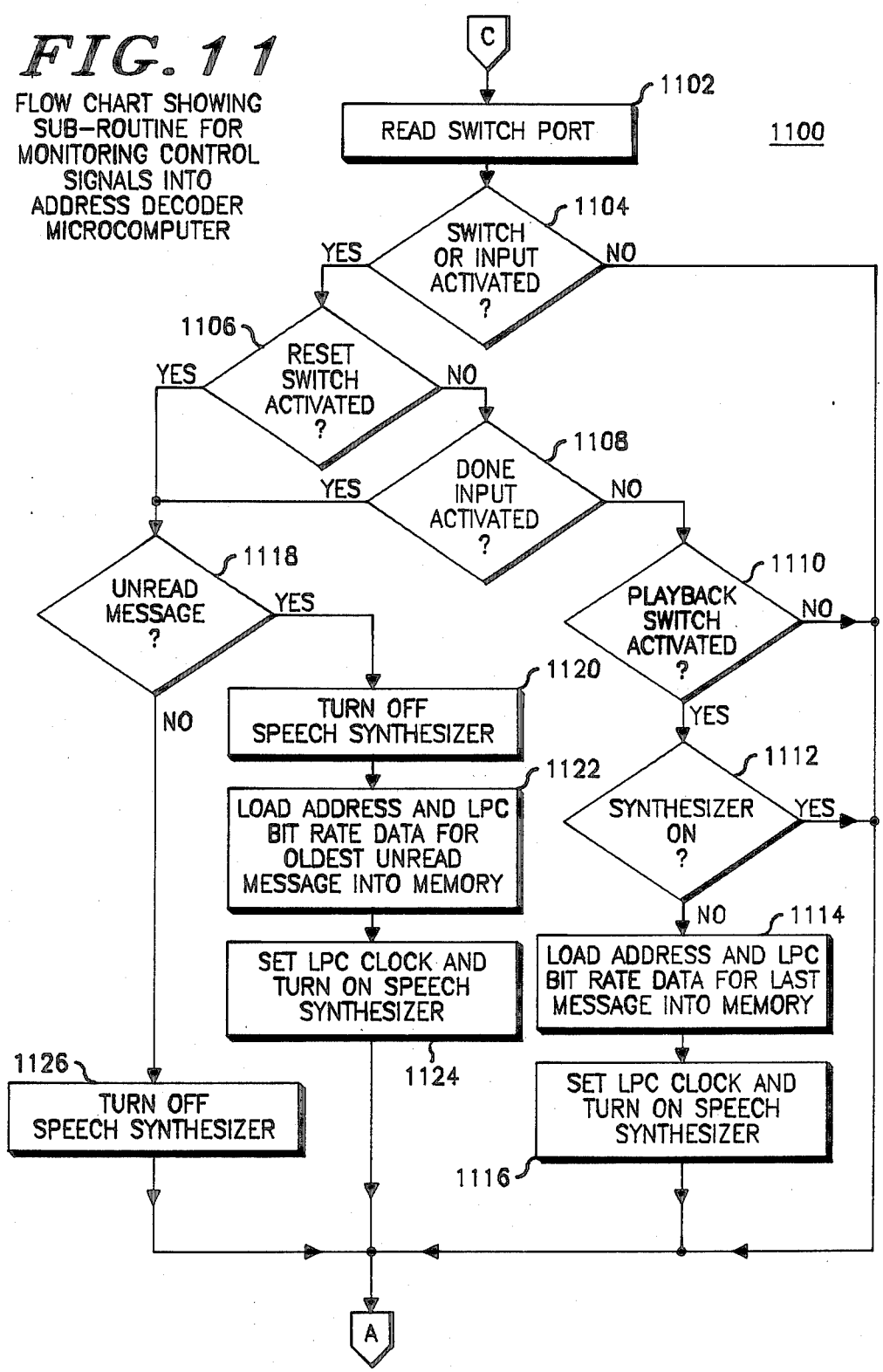
FIG. 11 is a flow diagram detailing the operation of the address decoder routine for monitoring control signals into the address decoder microcomputer.

FIG. 11 is a flow diagram detailing the operation of the address decoder routine 1100 for monitoring signals which control the address decoder microcomputer 606 of FIG. 6. The routine 1100 is activated during every bit sample interval to examine the status of the user controlled input switches the paging receiver. Input C from FIG. 9C is connected to item 1102 which examines each control input. Decision 1104 then determines whether any switch has been activated. If a switch has been activated, decision 1106 determines whether it was the reset switch. If the reset switch was detected, decision 1118 determines whether the paging receiver has received and stored any LPC encoded voice messages since the receiver was last reset, that is, if there is an unread message stored in memory. If an unread mesage is present in memory, item 1120 is selected to disable the speech synthesizer 112. Item 1122 then fetches the address data for the oldest unread message in memory and stores this information in the command word location. Item 1124 then activates the synthesizer and its memory controller. The operation of the synthesizer and its memory controller are discussed in more detail below. The routine returns to return point R after the message playback has been completed. If no unread messages were found in memory, decision 1118 selects item 1126 to disable the synthesizer 112 and return to return point R. If the monitor routine 1100 is activated while a stored LPC voice message is being played, decision 1106 selects decision 1108 to determine whether the speech synthesizer 112 had detected the end of the message and activated the 'done' control 124. If the 'done' control 124 was active, decision 1118 is selected to determine whether any other unread messages are present in memory. The decision path described above is then repeated. If a message was not being played, decision 1110 is selected to determine whether the playback control 120 has been activated. If the playback switch 120 is active, decision 1112 is selected to determine whether the synthesizer and memory controller 112 are active. If the synthesizer and memory controller 112 are active, decision 1112 returns to return point R. If the synthesizer and memory controller 112 are not active, item 1114 retrieves the load addres for the last message loaded into memory. Item 1116 then activates the speech synthesizer to reproduce the message indicated by the retreived load address. If decision 1110 did not detect an active playback switch, it returns the routine 1000 to return point R. At return point R on FIG. 5A, the decoder waits for the timer to time out another sample interval. The operation of the subroutine 1100 causes any unread messages to be played back at the appropriate LPC bit rate whenever the playback or reset controls are activated. In the absence of an unread message, the activation of the playback control plays back the last message received.

Figure 12:
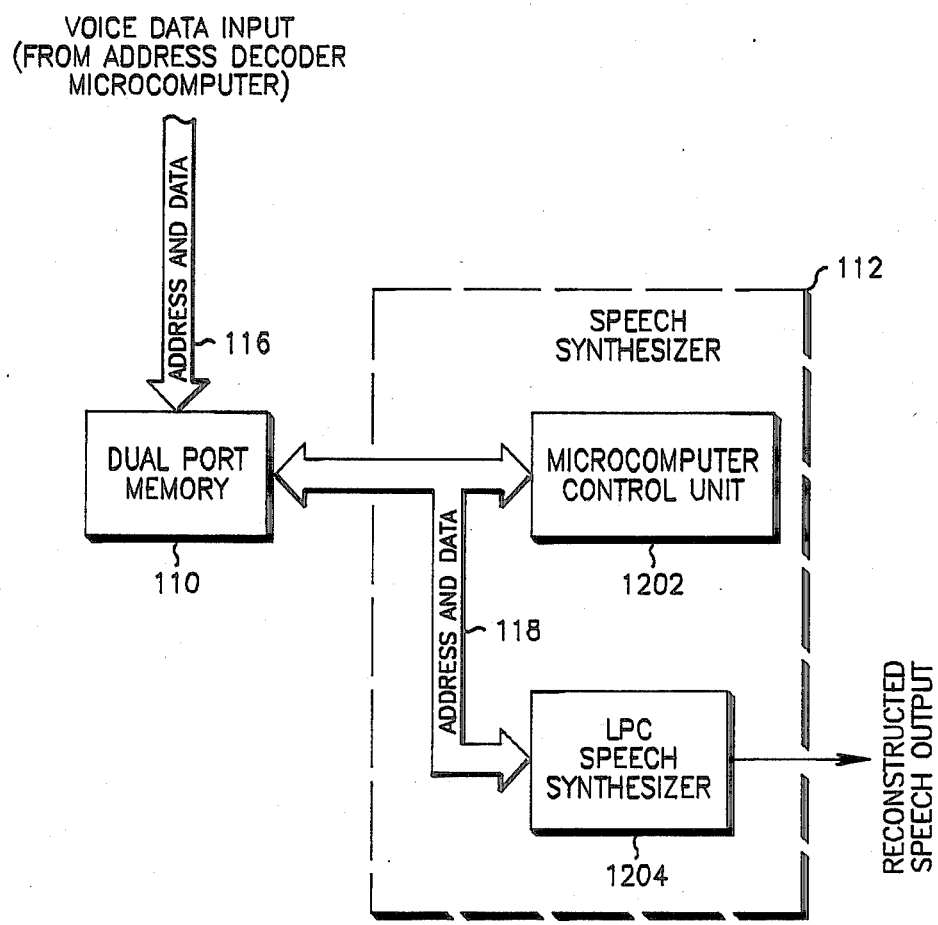
FIG. 12 is a block diagram showing the structure of the dual port memory/speech synthesizer interface circuitry.

FIG. 12 is a block diagram showing the structure of the dual port memory/speech synthesizer interface circuitry of the paging receiver of the present invention. The LPC speech synthesizer 612 of FIG. 6 includes a microcomputer control unit 1202 and an LPC speech synthesizer. An address and data bus 618 is coupled between the microcomputer control unit 1202 and the LPC speech synthesizer 1204. The address and data bus 612 is also coupled to one port of the dual port memory 610. Another port of the dual port memory 610 is coupled to the microcomputer and memory control unit 606 of FIG. 6 through the address and data bus 616. The reconstructed speech signal is produced at terminal 115 of the LPC speech synthesizer 1204.

The microcomputer control unit 1202 reads the contents of the control words described above and retrieves messages and presents them to the synthesizer 1204 as instructed by the control word. The detailed operation of the control word is further described in conjunction with FIG. 10.

Figure 13:
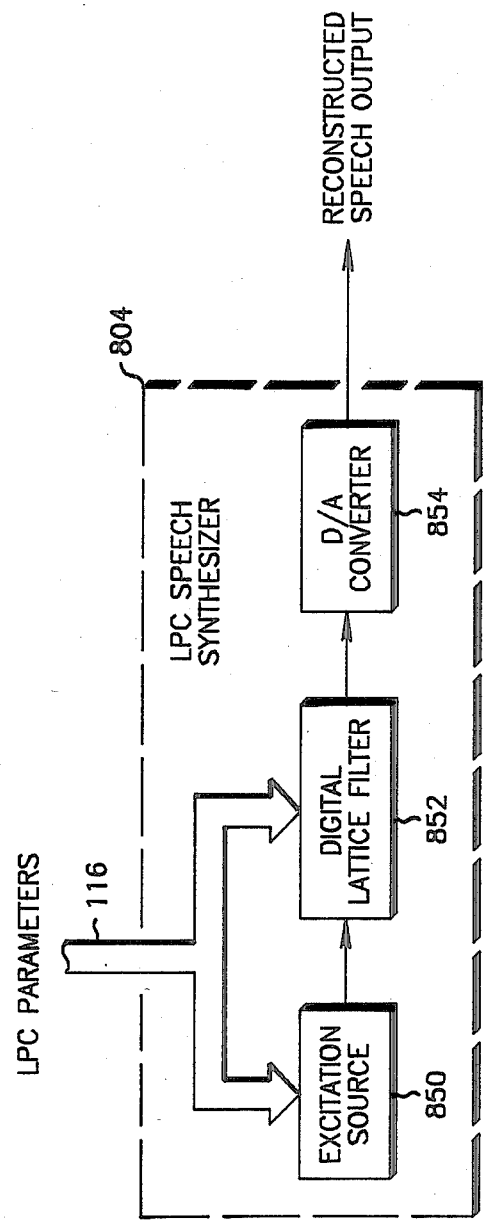
FIG. 13 is a block diagram of speech synthesizer apparatus suitable for use with the present invention.

FIG. 13 is a block diagram of speech synthesizer apparatus 1204 of FIG. 12. The LPC speech synthesizer includes an excitation source 1250 and a digital lattice filter 1252 which generate speech signals based on information received over the address and data bus 116. The LPC parameters used by the excitation source 1250 indicate whether a particular sound is voiced or unvoiced. The digital lattice filter 1252 will then modify this signal based on a series of reflection coefficients received over the address and data bus 116. The digital output of the digital latice filter 1252 is converted to reconstructed analog speech by the D/A converter 1254. One example of a speech synthesizer having a microcomputer control unit which would perform satisfactorily with the LPC system of the present invention is described in U.S. Pat. No. 4,389,537, filed Oct. 3, 1980, invented by Tsunoda et al. Other well known LPC speech synthesizers could also be employed.

Figure 14:
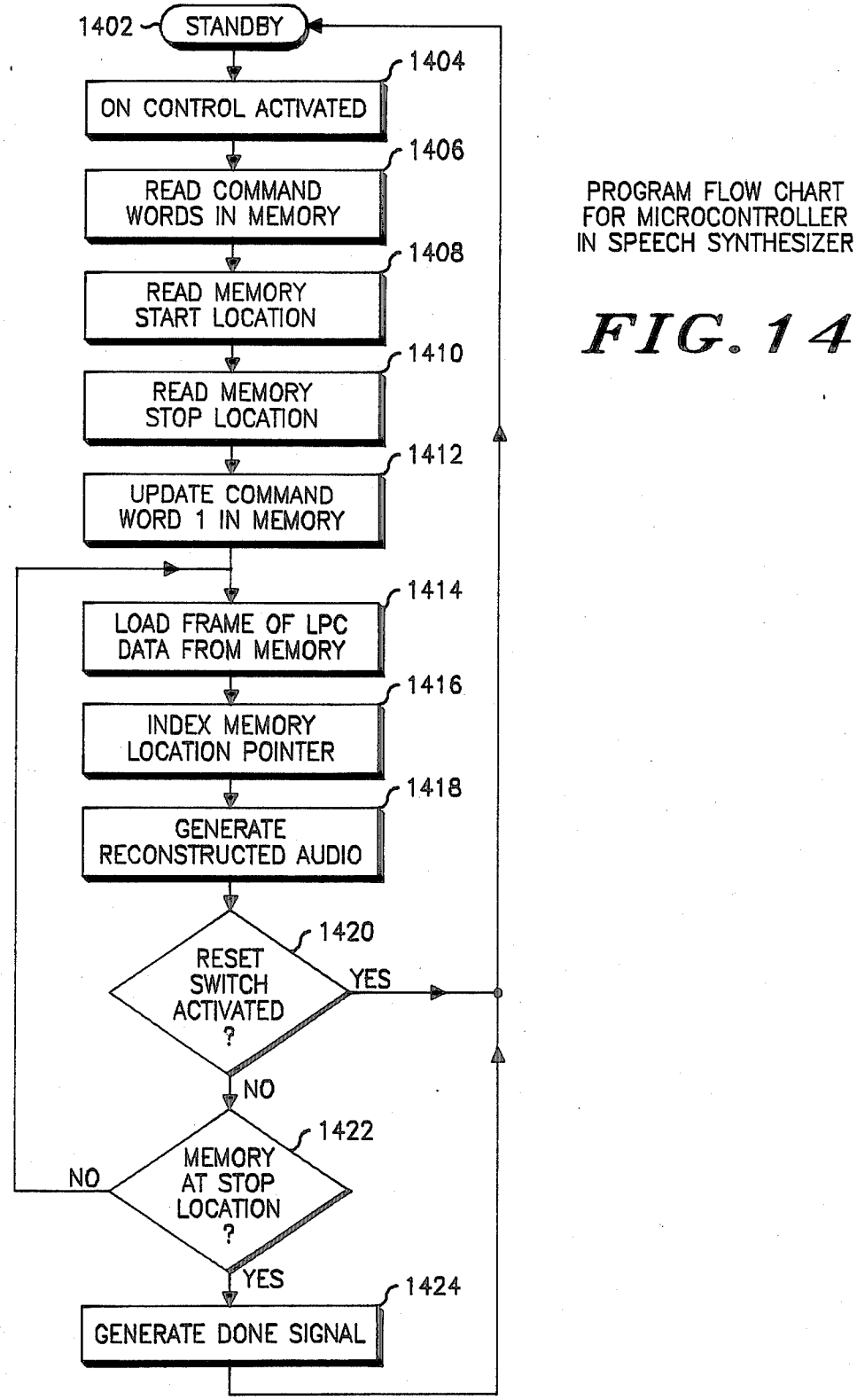
FIG. 14 is a flow diagram of the operation of the speech synthesizer microcontroller of FIG. 8.

FIG. 14 is a flow diagram of the operation of the speech synthesizer microcomputer 1202 of FIG. 12. The routine 1400 typically is resident in the standby mode. Item 1404 is selected whenever the 'ON' control 122 is activated. Item 1406 reads the command words into memory and item 1408 determines the memory location coresponding to the start of the message. Item 1410 determines the address of the last byte of message in memory. Item 1412 updates the command word 1 in memory to indicate that the message is now a read message. Item 1414 then retreives a frame of LPC information from memory. Item 1416 then updates the index memory pointer for the next byte. The LPC speech is reconstructed by item 1418. Decision 1420 then tests to determine whether the reset input was activated. If the reset input was activated, the YES branch returns to standby at 1402. Decision 1422 tests the retrieved data to determine whether the memory stop location is the current location. If not, item 1414 is selected to retrieve the next LPC frame. If the entire message has been played, decision 1422 selects item 1424 to generate the done signal produced at terminal 124. While the preferred embodiment of the present invention is disclosed in the contex of modifying the LPC bit rate based on system loading, it will be apparent to those of ordinary skill in the art that another criteria such as time of day could also be used.

While specific embodiments of this invention have been shown and described, further modifications and improvements will occur to those skilled in the art. All modifications which retain the basic underlying principles disclosed and claimed herein are within the scope of this invention.

We claim:

1. An improved paging system for use with LPC encoded signals, said system comprising:
   (a) telephone interface means for inputting paging requests and analog voice information;
   (b) loading measurement means coupled to said telephone interface means for determining the relative loading of said paging system at any particular time and producing an output signal related to said system loading;

(c) terminal means having storage capability, said terminal means coupled to said telephone interface means and generating paging signalling information based on signals taken form said telephone interface means, and further storing and reproducing voice information received from said telephone interface means;

(d) variable clock means, coupled to said load measurement means for producing a clock signal wherein the clock rate is based on said output signal of said loading means and lower clock rates are produced at times of relatively higher system loading;

(e) LPC analyser means having a clock input, said analyzer means coupled to said terminal means for converting said voice information to digitally encoded LPC signals at a data rate determined by said clock input;

(f) controller means coupled to said terminal means, said analyzer means and said loading measurement means for formatting said LPC encoded voice information, and said paging signaling information in a predefined sequence which includes a digital word indicating the data rate of said predefined sequence; and (g) modulator and transmitter means for transmitting said predefined sequence.

2. A method for use in a paging system having LPC speech encoder coupled to a paging terminal for generating a digitally encoded voice signals for transmission to paging receivers, said method comprising the steps of:

(a) inputting voice signals comprising paging messages;

(b) periodically measuring whether the paging system loading has increased or decreased since the last period;

(c) generating a variable signal which indicates a system load value;

(d) converting said inputted voice signals into LPC encoded digital voice signals at a data rate controlled by said variable signal.

(e) combining said LPC encoded digital voice signals with paging signalling information to generated a composite paging signal; and (f) transmitting said composite paging signal.

* * * * *